April 2, 1968     D. B. DEEKS     3,375,855
STEAM BOILER BLOWDOWN VALVE
Filed Sept. 13, 1965     2 Sheets-Sheet 1
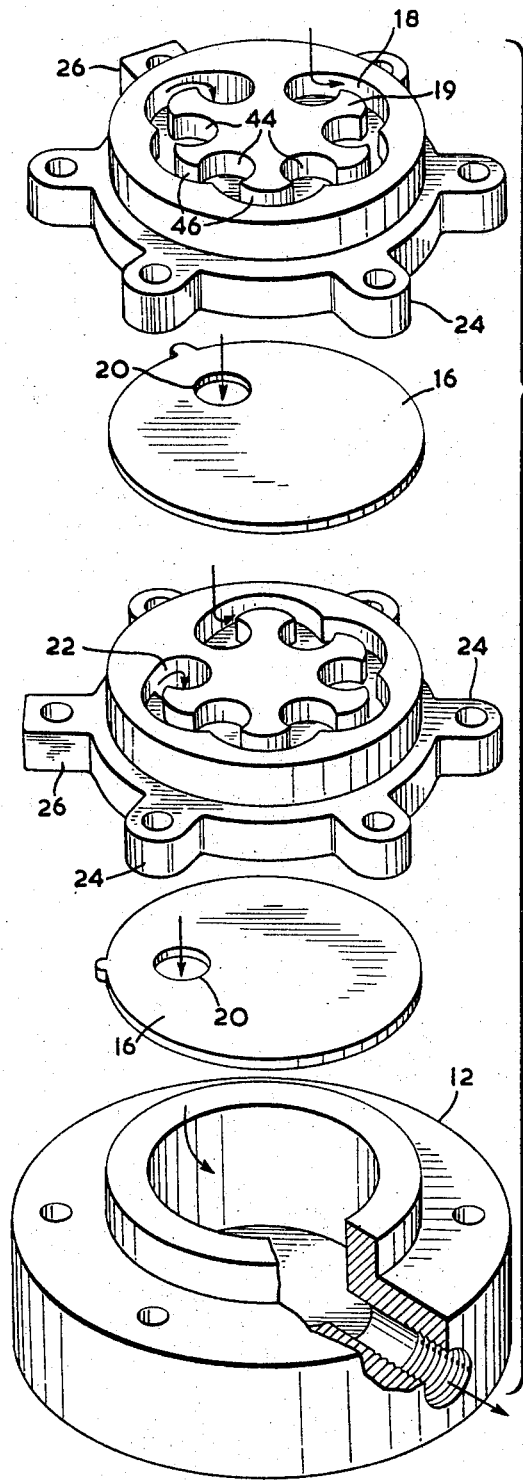
INVENTOR.
DOUGLAS B. DEEKS
BY~ Featherstonhaugh & Co.
ATTORNEYS

United States Patent Office 3,375,855
Patented Apr. 2, 1968

3,375,855
STEAM BOILER BLOWDOWN VALVE
Douglas B. Deeks, 197 Forest Hill Road,
Toronto, Ontario, Canada
Filed Sept. 13, 1965, Ser. No. 486,803
Claims priority, application Canada, Sept. 24, 1964,
912,410
7 Claims. (Cl. 138—42)

This invention relates to a valve device for achieving a continuous water blowdown in a steam boiler.

In the operation of steam boilers water enters the boiler, is evaporated and distilled water in the form of steam is taken away. The result of this process is a continual buildup of the amount of dissolved solids and suspended matter in the boiler water. Under some conditions the boiler water can contain so much dissolved solids and suspended matter that it becomes sluggish and cannot adequately carry the heat away from the heating surfaces of the boiler and the solids, which have entered the boiler either dissolved in the water or as suspended matter, tend to bake on the heating surfaces in the form of a scale. The formation of scale results in poor heat transfer from the boiler flame through the heat transfer surface to the water, which in turn results in at least greatly reduced efficiency. It can also result in bulging the furnace of the boiler, buring out of the tubes or distorting the tube sheets as a result of overheating from lack of heat transfer.

It might be added that the dissolved solids which enter the boiler tend to come out of solution either due to supersaturation of the water or chemical changes caused by the heat, and combined with the suspended matter cause the scaling noted above.

Remedial measures are almost universally adopted to prevent scale formation on boiler tubes and walls, one of which is the addition of chemicals to the boiler water with a view to changing its composition so that the dissolved salts tend to become sludge on coming out of solution as a result of heating in the boiler and settle to the bottom of the boiler instead of baking on the boiler tubes and walls. Some boiler additives change the nature of the salts which tend to become insoluble on heating to salts that remain more soluble. Some waters are pretreated before entering the boiler to make them more satisfactory for boiler operation. There are many ways and systems for treating boiler water to achieve a desired end.

All steam boilers are fitted with a manual blowdown device at one or two of the lowest points in the boiler. These blowdown devices are valves that are periodically opened to allow sludge that has settled there to be blown out and to allow the water from the boiler to be removed to reduce the amount of dissolved solids therein.

In many applications a manual blowdown at the bottom of a boiler is not sufficient for the purpose of maintaining the amount of undesirable salts in solution and suspended matter at a reasonably low level between blowdowns. In such cases it is a practice to install a continuous blowdown device near the water level in the boiler. This is a device which constantly drains a predetermined amount of water heavy with dissolved salts and suspended material from the boiler, whereby to maintain the level of undesirable dissolved salts and suspended matter at a safe level from the point of view of boiler operation. Continuous blowdown is especially necessary where high boiler pressures are encountered. At 600 pounds per square inch pressure in a boiler the temperature of the water is approximately 486° F. as it changes to saturated steam. On the other hand, at a pressure of 20 pounds per square inch the temperature of the water is only 227° F. as it changes to steam. With the hotter water a better circulation over the heated surfaces is necessary in order to carry the heat away before it builds up in the boiler tubes and walls to a danger level. At higher pressures the smallest amount of scale or sediment baking on the tubes can cause tube failure.

The customary method of achieving continuous blowdown is by means of a flow control valve set at a slightly open position. The valve aperture is controlled in size to achieve a steady high velocity escape of water from the boiler. It will be apparent that the aperture must be extremely small and that undue enlargement of the continuous blowdown aperture will raise fuel costs to a prohibitive level. Therefore, continuous blowdown valves are designed to achieve a high velocity, low flow escape of water from the boiler. The escaping water carries abrasive matter with it, which in a relatively short space of time wears the valve or valve seat, enlarging the operative orifice; frequent adjustment and/or replacement of the valves is necessary. Adjustment is often by a hit and miss process, with the result that if the valve is opened too wide, poor fuel economy is achieved, and if the valve is not opened enough, improper blowdown is the result.

Thus, with the present type of restricted orifice it is impossible to continuously maintain correct flow rates through the valve because wear constantly increases the flow rate. As a result continuously increasing quantities of raw water are brought in to compensate for greater blowdown. This requires increased chemical treatment, which adds to the amount of sludge and suspended matter. It also increases fuel costs due to the necessity of heating a greater amount of cold makeup water.

The present invention provides a continuous blowdown device that overcomes these disadvantages. It provides a continuous blowdown device that resists the escape of water from the boiler and limits it to the desired amount by the provision of a tortuous path having twists that are adapted to resist the flow of water under pressure as distinct from a restricted orifice that resists the flow due to its restricted size. The water path does not tend to become worn to the extent that its water conducting characteristics are changed, with the result that it is not necesary to continually adjust it during use.

Generally speaking, a continuous blowdown device according to this invention has an inlet and an outlet header. There are a plurality of housings between the inlet and outlet header, each of the housings having a chamber with an inlet and an outlet. The chamber defines a tortuous water passage between the inlet and outlet of the chamber, and means are provided for maintaining the housings in serial arrangement with the inlet of the chamber of the first housing communicating with the inlet header, the outlet of the chamber of the last housing communicating with the outlet header, and the outlet of the chamber of the housings preceding the last housing communicating with the inlet of the chamber of the next following housing, whereby to form a continuous and composite tortuous path through the chambers of the housings from the inlet header to the outlet header. The continuous and composite tortuous path has twists that are adapted to resist the flow of water under pressure at the inlet header to a boiler continuous blowdown flow rate. The invention will be clearly understood after reference to the following detailed specification read in conjunction with the drawings.

In the drawings:

FIGURE 1 is an exploded view of component parts of a blowdown device according to the invention showing the route taken by the water through the tortuous path;

FIGURE 2 is a perspective view of a disc and a gasket which combine to form a housing;

FIGURE 3 is a view of a blowdown device according to the invention partly broken away to illustrate construction.

Figure 4:
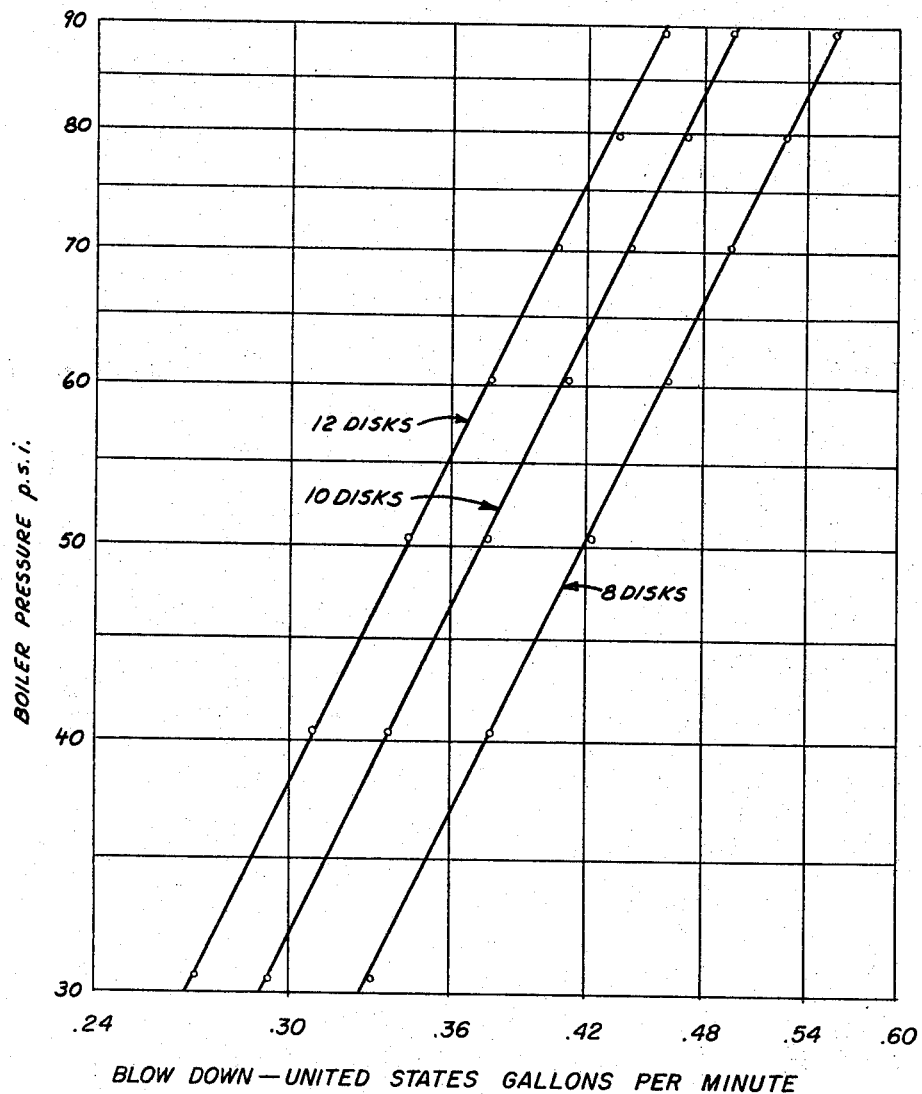
FIGURE 4 is a graph showing variation of blowdown rate and number of discs.

In the drawings, the continuous boiler blowdown device there shown has an inlet header 10, an outlet header 12 and a plurality of housings serially arranged and maintained between the inlet header 10 and the outlet header 12.

The housings each comprise a metal plate 14 and a gasket 16, and are each formed with a socket on their underside, as viewed in FIGURE 2, and a protrusion on their upper side, as seen in FIGURE 1, the protrusion being complementary to the socket so that they nest with each other when stacked in serial arrangement, as shown in FIGURE 3.

As indicated above, each of the housings has a chamber with an inlet and an outlet that defines a tortuous water passage between the inlet and outlet. In this respect the top surface is formed with an arcuate channel 18 which extends around the principal axis thereof that in turn extends through the plate-like surface thereof. This open channel is closed at the top by means of a cooperating gasket 16 to define a tortuous path through the housing. The inlet to the tortuous path is achieved through a hole, such as the hole 20, in the gasket 16 and the outlet is achieved through a hole through the lower surface of the plate, such as indicated at the numeral 22. In this connection the gasket 16 underlying each plate 14 is formed with its hole 20 aligned with the outlet opening 22. It also communicates with the inlet opening of the tortuous path of the chamber of the next following housing.

The plates are maintained in serial arrangement by means of bolts 23 that clamp them between the headers 10 and 12 and that pass through spaced apart lugs 24 and 26 on the sides of the plate.

As indicated above, the tortuous paths through the housings 14 are arranged so that the inlet of each of them communicates with the outlet of the path of the next preceding housing, whereby all housing paths cooperate to form a continuous and composite tortuous path through all of the chambers of the housings. In this connection the top housing shown in FIGURE 3 is disposed with its protrusion extending into a complementary socket on the inlet header 10, a gasket 16 having a hole 20 aligns with the outlet opening 30 of the header 10; thus the passage which defines the tortuous path 18 has an inlet which communicates with the outlet of the header. The outlet of the tortuous path 18 of the top housing, as indicated by the numeral 22, aligns with the inlet of the housing underneath it. In this connection there is again a gasket between the housings, where the protrusion of the second housing enters the socket of the first housing. The gasket has a hole similar to the hole 20 which aligns with the outlet opening of the tortuous path in the top housing and provides communication between the outlet of the top housing and the inlet of the next following housing.

This complementary socket and protrusion construction is adapted to serve as a safety device in the event of steam escape from gasket failure in use. The steam escape is impeded and directed axially of the device where it is not as dangerous as if directed radially outwardly of the device.

The third housing from the top is connected to the second housing from the top in a similar fashion, that is, its protrusion enters the socket of the second housing and a gasket is fitted between them. The gasket has a hole 20 which permits communication between the outlet 22 of the second housing and the inlet of the third housing.

It will be noted that the sockets 22 on the underside of the housings each have a niche 32 adapted to receive the complementary lug on the surface of the gaskets 16. This niche correctly locates the hole 22 through the housing to align it with the opening 20 in the gasket 16.

The housing with the protrusion is, of course, aligned with the housing in advance of it so that its inlet communicates with the outlet of the preceding housing. This alignment is achieved by means of the rectangular shaped lug 26. There are in all six tie lugs for securing the housings in serial arrangement between the headers. Five of them are according to design 24 with rounded ends and one has a square end. The inlet and outlet openings of the tortuous path of each of the housings are 60° apart, with the result that each succeeding housing from top to bottom must be misaligned with respect to the one in advance of it by 60°. All of the plates 14 are of similar design; thus by moving the lug 26 one 60° position in a counterclockwise direction, looking from the top in FIGURE 3, for each successive plate, starting with the top, correct alignment of the discs to achieve a continuous tortuous path from all of the separate tortuous paths of the separate plates is achieved. This manpulation of lugs 26 is shown in FIGURE 3.

The inlet header 10 has a three-way valve 40 associated therewith that can be shut off to prevent flow through the device or opened to permit flow through the device, as described above, or opened to cut off flow through the outlet 30 and the tortuous path of the device and divert flow through a blowdown tube 42. Blowdown tube 42 has no or little resistance to flow.

It will be apparent that the resistance of the composite tortuous path is quite substantial and that the resistance does not depend upon a flow path of restricted cross section. The resistance is achieved by a plurality of cyclonic chambers 44, which are interconnected by twisting interconnecting passages 46.

Each of the cyclonic chambers 44 have an entry and an exit where they communicate with their respective interconnecting passages 46. The entry and exit are arranged relative to each other such that water passing through the entry tends to cross the path of water entering the exit as it has been swirling around the cyclonic chamber. The result is the creation of eddies, countercurrents and greatly increased resistance to the flow of water. There is a substantial increase in impedance to the flow of water as it circles through the exit section due to the interference therewith of water from the entry section; the two flows being at approximately the same speed and pressure creates substantial resistance as they try to break through each other.

By arranging a plurality of plates between headers, as illustrated in the drawings, a sufficient resistance to the flow of water can be built up to achieve a continuous blowdown of a boiler. The path has sufficient resistance to achieve a slow rate of flow with a relatively large cross section. The velocity flow rate is slow.

The number of plates that are clamped together between the headers in any particular application depends upon the boiler pressure and the desired blowdown rate. The plates illustrated in the drawings have a protrusion with a diameter of about one and one-half inches. The cross section of the curved interconnecting passages between the cyclonic chambers is about one-eighth of one square inch. FIGURE 4 shows graphically the relationship between boiler pressure and blowdown in United States gallons per minute for a device having twelve plates, ten plates and eight plates respectively. It will be apparent that a predetermined optimum blowdown rate can be readily achieved by selecting from such a chart as FIGURE 4 the number of plates required to give this blowdown rate for a selected boiler pressure.

What I claim as my invention is:

1. A device for continuous boiler blowdown and like uses, comprising an inlet header, an outlet header, a plurality of housings between said inlet header and said outlet header, each of said housings having a chamber with an inlet and an outlet, said chamber of each of said housings defining a tortuous water passage between the said inlet and outlet of said chamber, said tortuous water passage in each of said housings including a plurality of interconnected cyclonic chambers, means for maintaining said housings in serial arrangement with the inlet of the chamber of the first housing communicating with said inlet header, the outlet of the chamber of the last housing communicating with said outlet header and the outlet of the chamber of housings preceding the last housing communicating with the inlet of the chamber of the next following housing whereby to form a continuous and composite tortuous path through said chambers of said housings from said inlet header to said outlet header, said continuous and composite tortuous path having twists adapted to provide resistance to the flow of water under pressure at said inlet header to a boiler continuous blowdown flow rate.

2. A device as claimed in claim 1, in which said housings each have a principal axis, said tortuous water path of each of said housings extending around its respective principal axis, the principal axes of all of said housings being aligned.

3. A device as claimed in claim 2, in which each of said housings comprises a plate having a first surface and a second surface opposite to said first surface, said first surface being formed with an arcuate open channel to partially define said tortuous path in said chamber.

4. A device as claimed in claim 2, in which each of said housings comprises a plate having a first surface and a second surface opposite to said first surface, said first surface being formed with an arcuate open channel to partially define said tortuous path in said chamber, a gasket overlying said first surface of said housings, the surface of said gasket combining with said channel to define said tortuous path.

5. A device as claimed in claim 2, in which each of said housings comprises a plate having a first surface and a second surface opposite to said first surface, said first surface being formed with an arcuate open channel to partially define said tortuous path in said chamber, in which the second one of said two surfaces of each of said plates being formed with a socket and the other of said two surfaces being formed with a protrusion complementary with the said sockets, the sockets and protrusions of adjacent plates being in complementary relation to each other and adapted to form a barrier to steam escape in the event of breakdown.

6. A device as claimed in claim 2, in which each of said housings comprises a plate having a first surface and a second surface opposite to said first surface, said first surface being formed with an arcuate open channel to partially define said tortuous path in said chamber, a gasket overlying said first surface of said housings, the surface of said gasket combining with said channel to define said tortuous path, in which the second one of said two surfaces of each of said plates being formed with a socket and the other of said two surfaces being formed with a protrusion complementary with the said sockets, the sockets and protrusions of adjacent plates being in complementary relation to each other and adapted to form a barrier to steam escape in the event of breakdown.

7. A device as claimed in claim 2, in which each of said housings comprises a plate having a first surface and a second surface opposite to said first surface, said first surface being formed with an arcuate open channel to partially define said tortuous path in said chamber, said means for mounting said housing serially arranged as aforesaid comprising a plurality of bolts tightened between said headers, and a plurality of lugs spaced apart around the circumference of said plates, said bolts extending through said lugs.

References Cited
UNITED STATES PATENTS

| | | | |
|---|---|---|---|
| 1,707,912 | 4/1929 | Heindorf | 138—26 |
| 2,910,830 | 11/1959 | White | 138—26 X |
| 3,130,747 | 4/1964 | Benaway | 138—40 X |
| 3,198,214 | 8/1965 | Lorenz | 138—37 |

LAVERNE D. GEIGER, *Primary Examiner.*

N. C. CUDDEBACK, *Assistant Examiner.*